Patented Aug. 25, 1942

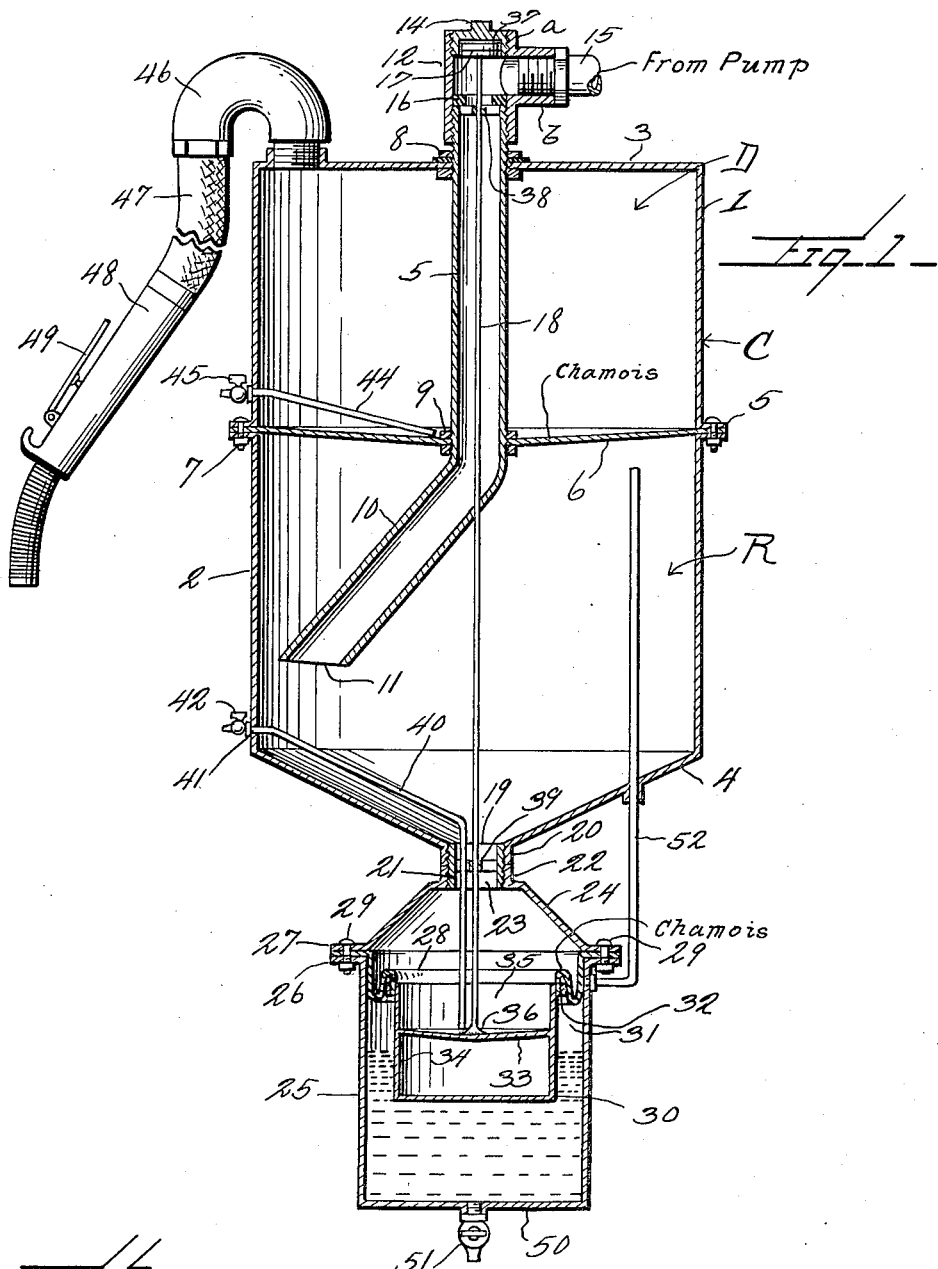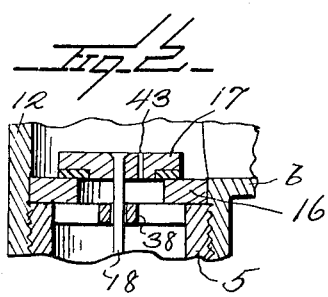

2,294,263

UNITED STATES PATENT OFFICE 2,294,263

FILTER

Joseph L. Wilson, Matawan, N. J.

Application December 6, 1940, Serial No. 368,955

8 Claims. (Cl. 210—166)

This invention relates to a filter and has relation more particularly to a device of this kind to be used in connection with gasoline dispensing equipment, and it is primarily an object of the invention to avoid water, scale or other foreign matter from storage equipment being pumped into the supply tank for an internal combustion engine.

The invention also has for an object to provide a device of this kind particularly adapted to be interposed in the discharge line of a service pump and wherein the device comprises a filtering chamber through which the fuel passes before being discharged from the delivery line into a tank or the like, and wherein means are provided operating under the weight of the water or other foreign matter separated from the gasoline to shut off the flow of the fuel into the filtering chamber.

Another object of the invention is to provide a device of this kind for separating water and other foreign matter from gasoline as it passes through a filtering chamber together with means operating under the weight of accumulated matter separated from the gasoline to shut off the flow of the fuel into the filtering chamber with means for automatically cleaning out the accumulated foreign matter to allow further flow of the fuel into the filtering chamber.

The invention consists in the details of construction and in the combination and arrangement of the several parts of my improved filter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a vertical sectional view with parts in elevation illustrating a filtering device constructed in accordance with an embodiment of my invention;

Figure 2 is an enlarged fragmentary sectional view showing the fuel controlling valve in closed position.

As disclosed in the accompanying drawing, C denotes a container of desired dimensions and configuration and which is herein disclosed as comprising an upper section 1 and a lower section 2. The upper section 1 has its top closed by a flat head 3 while the bottom of the section 2 is closed by a head 4 herein disclosed as being of a conoidal form with its central or apex portion downwardly disposed.

The opposed ends of the sections 1 and 2 are provided with the outstanding surrounding flanges 5 between which are clamped the marginal portions of a separating element 6 herein disclosed as of chamois. The element 6 and the sections 1 and 2 are maintained in desired assembly through the medium of the clamping members 7 herein disclosed as conventional bolts and nuts.

While I have referred to the separating or filtering element 6 as being of chamois, it is to be understood that it may be of any character preferred it only being required that it filter out water or other foreign matter which may be discharged within the receiving or filtering chamber R.

The separating or filtering element 6 hereinbefore referred to separates the lower receiving or filtering chamber from the upper discharge chamber D. Extending downwardly through the discharge chamber D at the axial center thereof is a delivery tube 5 of desired diameter. This tube 5 is also disposed through the top head 3 of the section 1 and is clamped thereto by the holding members 8 on the tube 5 and coacting with the opposite faces of the head 3. This tube 5 is of a length to extend a desired distance above the head 3 and to also extend through the central portion of the separating or filtering element 6. The tube 5 is held to this element 6 by the clamping members 9 carried by the tube 5 and engaging the element 6 at opposite sides thereof.

The portion 10 of the tube 5 within the receiving chamber R is disposed on a downward incline of a desired degree and terminates closely adjacent to the side wall of said chamber R. The lower or discharge end 11 of the portion 10 of the tube 5 is disposed on a slight upward incline with the low point innermost. This portion 10 and the discharge end 11 thereof serve to deflect the fuel as delivered within the receiving chamber R and particularly to have such discharge of the fuel to occur at a point materially to one side of the center or apex portion of the head 4 of the section 2.

The upper extended portion of the tube 5 has threaded or otherwise secured thereto a T-coupling 12. The head $a$ of this coupling 12 is open at its top but normally closed by a plug 14. The stem $b$ of the coupling 12 is connected to the usual fitting 15 through which the fuel is discharged under pressure from a conventional gasoline dispensing equipment. The head $a$ of the coupling 12 immediately below the communication therewith of the stem $b$ is provided with a removable valve seat 16 herein disclosed as resting upon the upper end of the tube 5. This valve seat 16 has coacting therewith from above the flat valve member 17 suitably secured to the upper end portion of an elongated operating stem 18.

The lower or central portion of the head 4 of the receiving chamber R is provided with a relatively large opening 19 defined by a depending sleeve 20 to which is coupled by the nipple 21 the upstanding collar 22 defining a central opening 23 in the cover or lid member 24 for the float receptacle 25. The upper open marginal portion of the receptacle 25 is defined by an outstanding surrounding flange 26 upon which is superimposed an outstanding surrounding flange 27 extending around the peripheral portion of the cover or lid 24. Interposed between these flanges 26 and 27 is the outer marginal portion of a flexible skirt 28 preferably chamois. The flanges 26 and 27 are securely held together with the outer marginal portion of the skirt 28 tightly clamped therebetween by the fastening devices 29 herein disclosed as conventional bolts and nuts. The inner marginal portion of the skirt 28 tightly surrounds the upper portion of a float 30 which operates within the chamber 31 of the receptacle 25. The inner or lower portion of the skirt 28 snugly surrounds the upper portion of the float 30 and is tightly clamped thereto, as at 32, by a holding band or otherwise as may be preferred.

In the present embodiment of my invention the float 30 constitutes a hollow body with the top head 33 of the float a considerable distance below the upper marginal portion of the side wall 34 of the float whereby the top portion of the float constitutes a bucket or sediment chamber 35.

The valve stem 18 hereinbefore referred to is of a length to extend axially through the upper portion of the tube 5 and through the lower wall of the portion 10 of the tube 5 and through the opening 19 and into the chamber 31. The lower end of this stem 18 is welded, as at 36, or otherwise securely fixed to the central portion of the head 33. This stem 18 is of a length to assure the valve member 17 being in a position above the communication between the head $a$ and leg $b$ of the coupling 12 when the float 30 is in full buoyancy. When the valve member 17 is in this fully open position it is snugly received within a recess or pocket 37 provided in the inserted end of the plug 14. With the valve member 17 within the recess or pocket 37 chattering of the valve member 17 is eliminated.

The stem 18 is directed through a guiding spider 38 arranged within the upper portion of the tube 5 and through a guiding spider 39 positioned within the nipple 21.

The head 33 of the float 30 is slightly dished and terminating from above closely adjacent to the central portion of this head 33 is the lower end portion of a bleeder tube 40. This tube 40 extends up through the opening 19 in the head 4 of the chamber R and then extends laterally within said chamber R and through the side wall thereof, as indicated at 41. This tube 40 exteriorly of the chamber R carries a drain cock 42 of any preferred type. The engagement of the tube 40 with the side wall of the receptacle R as indicated at 41 constitutes the only support for the tube 40 and in practice it has been found that no additional support is necessary.

The valve member 17, as particularly illustrated in Figure 2, has disposed therethrough a restricted port 43 which provides communication with the tube 5 when the valve member 17 is in closed position for a purpose to be hereinafter more particularly referred to.

Extending within the discharge chamber D through a side wall thereof is a drain tube 44. The inner end of this tube 44 terminates closely adjacent to the filtering member or element 6 at the central part thereof and said tube 44 exteriorly of the chamber D carries a conventional drain cock 45.

The discharge chamber D has in communication therewith through the top head 3 thereof an outlet elbow 46 to which is connected an end portion of a hose 47. This hose is of desired length and is provided at its extremity with a nozzle 48 of a conventional type wherein the flow through said nozzle is normally closed by a manually operated valve, as indicated at 49.

The float chamber 31 has in communication therewith through the bottom wall 50 of the receptacle 25 a conventional drain cock 51.

In practice the float chamber 31 is initially primed as by pouring gasoline down through the tube 5 upon removal of the plug 14 or direct from the pump. This initial gasoline as received within the chamber will filter through the skirt 28 and with the rise of the level of the gasoline within the chamber 31 the float 30 will move upwardly and raise the valve member 17 to its fully open position.

The gasoline to be dispensed will be delivered from the pump under pressure down through the tube 5 into the receiving chamber R and said gasoline as it passes up through the filtering element or member 6 will have separated therefrom water, scale or other foreign matter received within the chamber R from the storage equipment for the gasoline. The filtered gasoline will be passed from the discharge chamber D out through the hose 27 upon opening of the valve 49 of the nozzle in a well known manner. The water and other foreign matter separated from the gasoline within the chamber R will precipitate to the bottom of said chamber R and pass down through the opening 19 and accumulate within the bucket or sediment chamber 35. Such matter as it accumulates within the bucket or chamber 35 will cause the float 30 to submerge within the gasoline within the float chamber 31. This submergence will, of course, be gradual but eventually the submergence of the float 30 will be sufficient to bring the valve member 17 down into closed position, as illustrated in Figure 2, whereby is shut off the flow from the pump except for the small stream allowed to pass into the tube 5 through the port 43 in the valve member 17. When the flow from the pump is substantially closed off by the valve member 17, the valve 49 of the nozzle is closed and the resultant pressure building up within the chamber R will force the water and other foreign matter collected within the bucket 35 to pass up and out through the tube 40, it being understood of course that during this period the drain cock 42 is open. After this cleaning out of the bucket or sediment chamber 35, the cock 42 is closed.

With the pump in operation any water or foreign matter which may precipitate within the chamber D upon the filtering element 6 may be readily drained out by opening the cock 45 for the tube 44.

It is to be noted that the skirt 28 is of such a length as to readily allow the desired up and down movement of the float 30 and it is also to be pointed out that by having the portion 10 of the tube 5 laterally inclined as hereinbefore stated, the discharge through the lower end 11 is to one side of the opening 19 thus assuring the fuel within the chamber R passing over said opening 19, which is the entrance to the receptacle 25, before such fuel reaches the filtering element 6. This is of particular advantage as the action of the closing movement of the valve member 17 is advanced in the event of a deluge of water coming into the chamber R with the gasoline. By this action the water will be prevented from reaching the filtering element or member 6 which would otherwise cause a severe strain upon said element or member 6.

In communication with the chamber 31 of the receptacle 25 at the top thereof and below the skirt 28 is a pressure equalizing line 52. This line 52 extends up into the chamber R through the bottom head 4 thereof and terminates at a point closely adjacent to the filtering element or member 6. This line 52 operates to keep the pressure uniform above and below the skirt 28 thereby insuring the operating position of the float.

In the following claims the device is set forth as separating liquids of different specific gravities flowing through the device under pressure. In so claiming the invention it is to be understood that it is also intended to include the separation of scale and other foreign matter.

From the foregoing description it is thought to be obvious that a filter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device for separating liquids of different specific gravities flowing therethrough under pressure comprising a container, a filtering element intersecting said container and dividing the same into a lower receiving chamber and an upper delivery chamber, a valve controlled outlet in communication with the delivery chamber, a tube for connection with a source of liquid under pressure discharging within the receiving chamber, a valve for closing the inlet to the tube, a receptacle below the container in communication with the delivery chamber of the container, said receptacle providing a float chamber for holding a liquid, a float within the chamber, a connection between the float and valve member, said float normally maintaining the valve member in open position, the upper portion of the float constituting a bucket, the liquid and the like held back by the filtering element precipitating into the receptacle and within the bucket, the increasing weight of the precipitate accumulated within the bucket moving the float downwardly and the valve member into closed position.

2. A device for separating liquids of different specific gravities flowing therethrough under pressure comprising a container, a filtering element intersecting said container and dividing the same into a lower receiving chamber and an upper delivery chamber, a valve controlled outlet in communication with the delivery chamber, a tube for connection with a source of liquid under pressure discharging within the receiving chamber, a valve for closing the inlet to the tube, a receptacle below the container in communication with the delivery chamber of the container, said receptacle providing a float chamber for holding a liquid, a float within the chamber, a connection between the float and valve member, said float normally maintaining the valve member in open position, the upper portion of the float constituting a bucket, the liquid and the like held back by the filtering element precipitating into the receptacle and within the bucket, the increasing weight of the precipitate accumulated within the bucket moving the float downwardly and the valve member into closed position, and a skirt of flexible material interposed between the upper portion of the float and the top portion of the receptacle, said skirt bridging the space between the float and the receptacle.

3. A device for separating liquids of different specific gravities flowing therethrough under pressure comprising a container, a filtering element intersecting said container and dividing the same into a lower receiving chamber and an upper delivery chamber, a valve controlled outlet in communication with the delivery chamber, a tube for connection with a source of liquid under pressure discharging within the receiving chamber, a valve for closing the inlet to the tube, a receptacle below the container in communication with the delivery chamber of the container, said receptacle providing a float chamber for holding a liquid, a float within the chamber, a connection between the float and valve member, said float normally maintaining the valve member in open position, the upper portion of the float constituting a bucket, the liquid and the like held back by the filtering element precipitating into the receptacle and within the bucket, the increasing weight of the precipitate accumulated within the bucket moving the float downwardly and the valve member into closed position, and a skirt of flexible material interposed between the upper portion of the float and the top portion of the receptacle, said skirt bridging the space between the float and the receptacle, said skirt constituting a filtering element.

4. A device for separating liquids of different specific gravities flowing therethrough under pressure comprising a container, a filtering element intersecting said container and dividing the same into a lower receiving chamber and an upper delivery chamber, a valve controlled outlet in communication with the delivery chamber, a tube for connection with a source of liquid under pressure discharging within the receiving chamber, a valve for closing the inlet to the tube, a receptacle below the container in communication with the delivery chamber of the container, said receptacle providing a float chamber for holding a liquid, a float within the chamber, a connection between the float and valve member, said float normally maintaining the valve member in open position, the upper portion of the float constituting a bucket, the liquid and the like held back by the filtering element precipitating into the receptacle and within the bucket, the increasing weight of the precipitate accumulated within the bucket moving the float downwardly and the valve member into closed position, the valve member having a port therethrough through which a restricted stream of liquid from the source of supply may pass when the valve member is in closed position and flow through the outlet is closed, a drain line leading from within the bucket of the float to a point exteriorly of the container, and means for closing flow through said drain line, the pressure built up within the receiving chamber by the liquid forced through the port of the closed valve member causing the precipitate accumulated within the bucket to pass out through the drain line when opened.

5. A device for separating liquids of different specific gravities flowing therethrough under pressure comprising a container, a filtering element intersecting said container and dividing the same into a lower receiving chamber and an upper delivery chamber, a valve controlled outlet in communication with the delivery chamber, a tube for connection with a source of liquid under pressure discharging within the receiving chamber, a valve for closing the inlet to the tube, a receptacle below the container in communication with the delivery chamber of the container, said receptacle providing a float chamber for holding a liquid, a float within the chamber, a connection between the float and valve member, said float normally maintaining the valve member in open position, the upper portion of the float constituting a bucket, the liquid and the like held back by the filtering element precipitating into the receptacle and within the bucket, the increasing weight of the precipitate accumulated within the bucket moving the float downwardly and the valve member into closed position, the valve member having a port therethrough through which a restricted stream of liquid from the source of supply may pass when the valve member is in closed position and flow through the outlet is closed, a drain line leading from within the bucket of the float to a point exteriorly of the container, means for closing flow through said drain line, the pressure built up within the receiving chamber by the liquid forced through the port of the closed valve member causing the precipitate accumulated within the bucket to pass out through the drain line when opened, a drain line extending within the delivery chamber and terminating closely adjacent to the central portion of the filtering element, and a valve for closing the flow through the drain line, the pressure building up within the delivery chamber when the valve member is closed and flow through the drain line is opened forcing any precipitate upon the filtering element out through the drain line.

6. A device for separating liquids of different specific gravities flowing therethrough under pressure comprising a container, a filtering element intersecting said container and dividing the same into a lower receiving chamber and an upper delivery chamber, a valve controlled outlet in communication with the delivery chamber, a tube for connection with a source of liquid under pressure discharging within the receiving chamber, a valve for closing the inlet to the tube, a receptacle below the container in communication with the delivery chamber of the container, said receptacle providing a float chamber for holding a liquid, a float within the chamber, a connection between the float and valve member, said float normally maintaining the valve member in open position, the upper portion of the float constituting a bucket, the liquid and the like held back by the filtering element precipitating into the receptacle and within the bucket, the increasing weight of the precipitate accumulated within the bucket moving the float downwardly and the valve member into closed position, said tube extending within the container through the top thereof, said tube being of a length to terminate closely adjacent to the bottom of the receiving chamber, the discharge end portion of the part of the tube within the receiving chamber being laterally directed to discharge within the receiving chamber to one side of the communication between the delivery chamber and the receptacle.

7. A device for separating liquids of different specific gravities flowing therethrough under pressure comprising a container, a filtering element intersecting said container and dividing the same into a lower receiving chamber and an upper delivery chamber, a valve controlled outlet in communication with the delivery chamber, a tube for connection with a source of liquid under pressure discharging within the receiving chamber, a valve for closing the inlet to the tube, a receptacle below the container in communication with the delivery chamber of the container, said receptacle providing a float chamber for holding a liquid, a float within the chamber, a connection between the float and valve member, said float normally maintaining the valve member in open position, the upper portion of the float constituting a bucket, the liquid and the like held back by the filtering element precipitating into the receptacle and within the bucket, the increasing weight of the precipitate accumulated within the bucket moving the float downwardly and the valve member into closed position, a skirt of flexible material interposed between the upper portion of the float and the top portion of the receptacle, said skirt bridging the space between the float and the receptacle, and means for equalizing the pressure on both sides of the skirt.

8. A device for separating liquids of different specific gravities flowing therethrough under pressure comprising a container, a filtering element intersecting said container and dividing the same into a lower receiving chamber and an upper delivery chamber, a valve controlled outlet in communication with the delivery chamber, a tube for connection with a source of liquid under pressure discharging within the receiving chamber, a valve for closing the inlet to the tube, a receptacle below the container in communication with the delivery chamber of the container, said receptacle providing a float chamber for holding a liquid, a float within the chamber, a connection between the float and valve member, said float normally maintaining the valve member in open position, the upper portion of the float constituting a bucket, the liquid and the like held back by the filtering element precipitating into the receptacle and within the bucket, the increasing weight of the precipitate accumulated within the bucket moving the float downwardly and the valve member into closed position, a skirt of flexible material interposed between the upper portion of the float and the top portion of the receptacle, said skirt bridging the space between the float and the receptacle, and a pressure equalizing line in communication with the receptacle at a point below but closely adjacent to the skirt, said line extending up within the receiving chamber and terminating in close proximity to the filtering element.

JOSEPH L. WILSON.